United States Patent [19]

Adlhart et al.

[11] Patent Number: 4,463,066
[45] Date of Patent: Jul. 31, 1984

[54] FUEL CELL AND SYSTEM FOR SUPPLYING ELECTROLYTE THERETO

[75] Inventors: Otto J. Adlhart, Tenafly; Haim Feigenbaum, Highland Park, both of N.J.

[73] Assignee: Engelhard Corporation, Iselin, N.J.

[21] Appl. No.: 430,144

[22] Filed: Sep. 30, 1982

[51] Int. Cl.³ ............................................ H01M 8/04
[52] U.S. Cl. ...................................... 429/34; 429/38; 429/72
[58] Field of Search .................... 429/34, 38, 39, 41, 429/13, 57, 80, 72, 44

[56] References Cited

U.S. PATENT DOCUMENTS 4,366,211 12/1982 Pollack ................................ 429/38

Primary Examiner—Anthony Skapars

[57] ABSTRACT

An electrolyte distribution and supply system for use with a fuel cell having means for drawing electrolyte therein is formed by a set of containers of electrolyte joined to respective fuel cells in a stack of such cells. The electrolyte is separately stored so as to provide for electrical isolation between electrolytes of the individual cells of the stack. Individual storage compartments are coupled by capillary tubes to the respective fuel cells. Hydrostatic pressure is maintained individually for each of the fuel cells by separately elevating each compartment of the storing means to a specific height above the corresponding fuel cell which is to be fed from that compartment of the storing means. The individual compartments are filled with electrolyte by allowing the compartments to overflow thereby maintaining the requisite depth of electrolyte in each of the storage compartments.

10 Claims, 3 Drawing Figures

FIG. I.

FUEL CELL AND SYSTEM FOR SUPPLYING ELECTROLYTE THERETO

The Government has rights in this invention pursuant to Contract No. DE-AC01-78ET15366 awarded by the U.S. Department of Energy.

BACKGROUND OF THE INVENTION

Reference is hereby made to other related patent applications which are assigned to the same assignee as the present application; Application of O. Adlhart entitled "Fuel Cell with Multible Porosity Electrolyte Matrix Assembly," Ser. No. 430,143, Filed On Sept. 30, 1984; Application of H. Feigenbaum entitled "Fuel Cell with Electrolyte Feed System," Ser. No. 430,156, Filed On Sept. 30, 1982; Application of J. Cohn, H. Feigenbaum and A. Kaufman entitled "Fuel Cell and System For Supplying Electrolyte Thereto with Wick Feed," Ser. No. 430,155, Filed On Sept. 30, 1982; and Application of H. Feigenbaum entitled "Fuel Cell and System For Supplying Electrolyte Thereto Utilizing Cascade Feed," Ser. No. 430,145, Filed On.

This invention relates to a fuel cell having electrodes with an electrolyte supporting structure interposed therebetween for the drawing of electrolyte into interaction regions at the electrodes for electrochemical reactions with fluidic reactants and, more particularly, to an electrolyte supply system coupled to said electrolyte support structure for storing electrolyte and conducting the stored electrolyte to the cell.

Much research is being done in the area of fuel cell technology in order to provide ever increasing amounts of electric power and for operating such cells over longer periods of time without any need for shutdown to accomplish maintenance. As compared to other methods of generation of electric power from combustible fuels, a fuel cell has higher efficiency and is also characterized by a simplicity of physical structure in that such cells can be constructed without any moving parts.

While a variety of electrochemical reactions are known for the conversion of fuel into electricity without the direct burning of such fuels, one well-known form of cell utilizes the reactions between oxygen and hydrogen, the hydrogen serving as the fuel. One common form of construction for the hydrogen-oxygen cell is the laminated structure wherein the electrodes are spaced apart by a porous layer of material which holds an electrolyte. For example, the electrolyte may be a concentrated phosphoric acid. The hydrogen is guided by passageways behind the active region of the anode and the oxygen is guided by passageways behind the active region of the cathode. At the anode, the hydrogen gas dissociates into hydrogen ions plus electrons in the presence of a catalyst, typically a precious metal such as platinum or platinum with other metals. The hydrogen ions migrate through the electrolyte to the cathode in a process constituting ionic current transport while the electron travels through an external circuit to the cathode. In the presence of a catalyst at the cathode, the hydrogen ions, the electrons, and molecules of oxygen combine to produce water.

In order to provide for the physical placement of the respective reactants at the catalyst layers of the anode and cathode, layers of materials having hydrophilic and hydrophobic properties are disposed in an arrangement contiguous to the catalyst layers. They permit the electrolyte and the oxygen at the cathode and the hydrogen at the anode to contact the catalyst layer. The hydrophobic material is provided with pores of sufficiently large size to permit the gaseous hydrogen and the gaseous oxygen to freely flow through the material so as to come into contact with the catalyst.

Details in the construction of fuel cells, and in the component parts thereof, are disclosed in the U.S. Pat. Nos. 3,453,149 of Adlhart and 4,064,322 of Bushnell. These two patents show structures for guiding the gaseous reactants into the regions of the catalyst. In addition, the Bushnell patent shows space within a cell for the storage of electrolyte so as to compensate for any changes in the quantity of electrolyte available for ion transport. An assembly for combining together a plurality of fuel cells in a single power source is disclosed in U.S. Pat. No. 4,175,165 of Adlhart. This patent also shows a manifold for the simultaneous feeding of the reactant gases to the cathode and the anode of the respective cells. The foregoing three patents are incorporated herein in their entirety by reference.

A problem arises during the operation of a fuel cell in that the cell has electrolyte losses. For instance, as a result of electrolyte volume changes, such as those due to temperature and composition changes, electrolyte can be driven out of the matrix and be permanently lost from use within the matrix. A fuel cell has limited capacity for the storage of additional electrolyte therein. Thus, depending on the amount of such storage capacity, there is a limitation on the length of time during which the fuel cell can be operated before shutdown for maintenance. Such maintenance includes the replenishment of the amount of electrolyte in the requisite concentration.

A further problem arises in the complexity of the structure required to lead the electrolyte in from a region of storage to the region of electrochemical activity alongside the layers of the catalyst. Such electrolyte lead-in structures are described in the foregoing Bushnell patent. In particular, it is noted that such structures tend to increase the size of the cell, to increase resistance losses associated with the flow of electric current, and to decrease the surface area available for the electrochemical reactions.

Yet another problem is the supplying of electrolyte to such a fuel cell in a manner in which it can be absorbed by the cell, and at such rate as may be necessitated by the loss of electrolyte during the operation of the cell.

SUMMARY OF THE INVENTION

The foregoing problems are overcome and other advantages are provided by a fuel cell and a system for supplying electrolyte thereto, both the cell and the supply system being fabricated in accordance with the invention. The cell is constructed with an electrolyte supporting structure having a means to draw and distribute electrolyte therein, and the supply system is constructed so as to make electrolyte available to the cell at such rates as may be required. The fuel cell comprises a laminated structure wherein the electrodes are spaced apart by a layer of porous material. In a preferred embodiment of the invention, the porous material is provided as a matrix assembly having a central layer of relatively large pores.

In accordance with the invention, the supply system is provided at a gravity feed wherein cups are provided at different elevations corresponding to the elevations of respective ones of the cells in a stack of such cells in a fuel cell power supply. A pump develops hydrostatic pressure for driving the electrolyte up into the respective cups.

In one embodiment, a set of conduits, in the form of capillary tubes, carries electrolyte from respective ones of the cups to electrolyte supporting members in respective ones of the fuel cells. The rate of flow of electrolyte into the cell is controlled by the electrolyte demand of the electrolyte supporting structure in each cell and by the hydrostatic pressure developed by the difference in height between a cup and its corresponding cell.

BRIEF DESCRIPTION OF THE DRAWING

The foregoing aspects and other features of the invention are explained in the following description taken in connection with the accompanying drawing wherein.

DETAILED DESCRIPTION OF THE INVENTION

Figure 1:
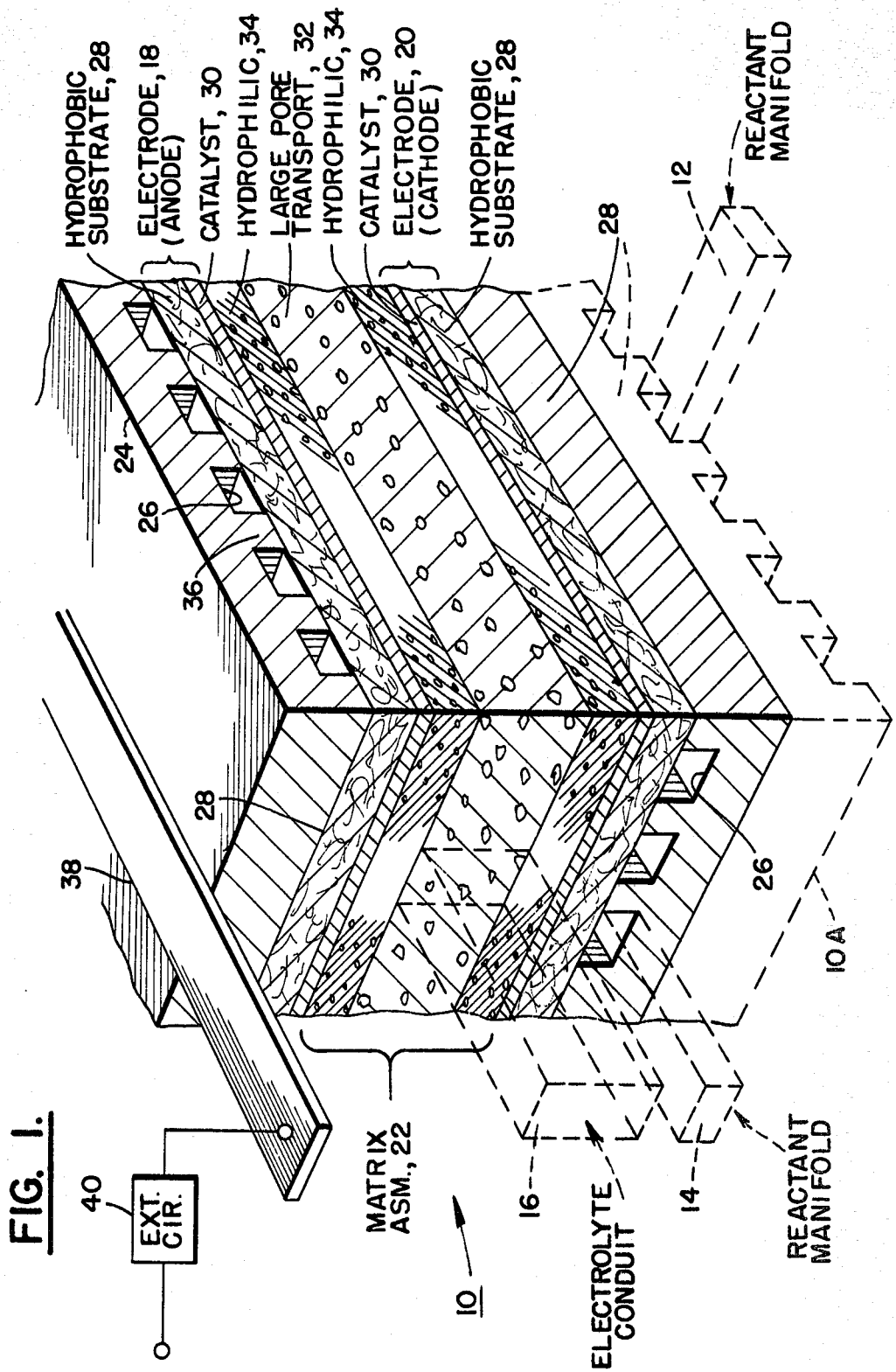
FIG. 1 is a perspective view of a portion of a stack of fuel cells in an assembly of such fuel cells, the portion comprising one complete fuel cell with a second cell being partially shown in phantom and the fuel cell being sectioned to identify the individual layers thereof.

In FIG. 1, a fuel cell 10 is shown in perspective view. A part of a second fuel cell 10A, having the same construction as the cell 10, is shown in phantom and is placed contiguous to the cell 10 as would be the case if the cell 10 is understood to be one of many such cells which would ordinarily be placed in a stack (not shown). Connections of the cells 10 and 10A via manifolds for the conveyance of electrolyte are shown schematically. Two such representative manifolds are shown, namely, a manifold 12 for the conveyance of hydrogen to the anode of respective cells of the stack and a manifold 14 for the conveyance of oxygen to the cathode of respective cells of the stack. A set of electrolyte conduits 16 (only one of which is shown) conveys electrolyte to the respective cells of the stack. Although manifolds 12 and 14 are shown in a representative fashion in FIG. 1, it is understood that a single manifold for each reactant running generally along the sides of the stack can feed reactants to the cells through respective passages 26.

The fuel cell 10 comprises two electrodes, namely, an anode 18 and a cathode 20 which are separated by a means to draw and distribute electrolyte such as an electrolyte matrix assembly 22. Each electrode abuts a reactant distribution plate 24. The top of the cell in FIG. 1, having grooves to bring in and distribute only one reactant since it is at the end of the stack has a plate 24. The plates 24 on the other side of the cell depicted are part of a bi-polar assembly made up of two gas distribution plates 24 in back-to-back position to supply reactants to the cell shown and the adjacent cell not shown. Plates 24, the termination plate and the bi-polar assembly, have passages 26 for the entry of fluidic or gaseous reactants and elimination of any residual gases. Each electrode comprises a hydrophobic substrate layer 28 and a catalyst 30. The plates 24 of the cell 10A provide a series interconnection of the two cells. The means to draw and distribute electrolyte in the cell can be of any suitable type. For instance, it can be a material having pores therein of a particular size to draw and distribute the electrolyte. Alternatively, it can be a material made from two or more layers of different size pores, such as that shown in FIG. 1.

The matrix assembly 22 comprises a central permeable layer 32 of fibrous carbon sheet material having relatively large pores, the central layer 32 being positioned between two outside permeable layers 34 with pores which are smaller than the pores of the central layer 34. An electrolyte, typically phosphoric acid, is contained in the central layer 32. The pores of the central layer 32 are sufficiently large to permit the electrolyte to freely migrate through the central layer 32 so as to replenish the electrolyte within the cell 10 as may be required. The central layer 32 need not necessarily be completely filled with the electrolyte, it being necessary only to provide sufficient electrolyte to insure ionic conductivity between the electrodes 18 and 20.

The smaller pores of the outside layers 34 exert a strong capillary force which draws in the electrolyte from the central layer 32 to completely fill the outside layers 34. Layers 34 have a fastrate of uptake of to the electrolyte contained in the large pore layer 32 as needed. By providing adequate electrolyte to layers 34, each outside layer 34 serves as a barrier against the flow of reactant gas into the matrix assembly area. Thus, electrolyte is found in each of the three layers of matrix assembly 22 to provide ionic conductivity to the matrix assembly 22, the matrix assembly 22 with the electrolyte therein serving as a path by which positive hydrogen ions can migrate via ionic current transport from the anode 18 to the cathode 20.

The outer layers 34 of the matrix assembly 22 have silicon carbide powder bonded with PTFE particles for increased hydrophilic properties to further insure that the layers 34 serve as gas barriers. In contrast, the hydrophobic layers 28 are impregnated with PTFE on the base material of the fibrous carbon to produce the hydrophobic characteristics. The porosity of the hydrophobic layer 28 is characterized by large pores through which the gaseous reactants can freely circulate so as to propagate from the passages 26 to the catalyst 30. Thus, the catalyst 30 is surrounded by hydrophobic and hydrophilic layers, the hydrophobic layer facing the gaseous reactants and the hydrophilic layer facing the electrolyte.

The hydrophobic layer 28 in each electrode is impregnated with Teflon to prevent the electrolyte from flooding into the electrode. This is an advantageous feature in the construction of the cell 10 since such flooding, if permitted, would reduce the number of open pores through which the gaseous reactants must pass in the electrodes. A reduced number of available pores would result in a diminution in the capacity of the cell to produce electricity.

The hydrophobic layer 28 brings the gaseous reactant into contact with the catalyst 30 while the hydrophilic layer 34 brings the electrolyte into contact with the catalyst 30. Thereby, respective electrochemical reactions can take place at the catalyst 30 of the anode 18 and at the catalyst 30 of the electrode 20. The catalyst 30 is conveniently formed of a precious metal such as platinum with or without other metals which, for the purpose of bonding and partial wet-proofing, is deposited on the hydrophobic layer 34. The same construction is utilized in each of the electrodes 18 and 20. It is noted that both the hydrophobic layer 28, the plate 24 and the electrodes 18 and 20 are electrically conducting. Thus, in the case of the anode 18, electrons released by the electrochemical reaction can propagate from the catalyst 30 through the fibrous carbon of the hydrophobic layer 28 and into the partitions or ribs 36 of the plate 24 which separate the respective passages 26.

In the series arrangement depicted in FIG. 1, the electrons from the anode of one cell are conducted directly to the cathode of the adjoining cell so as to migrate through the entire stack. An exemplary stack termination contact 38 is shown attached by conventional methods to the plate 24 of the anode 18. The contact 38 is coupled to an external circuit 40 (indicated in block diagrammatic form) while the other terminal of the external circuit 40 is coupled to a similar contact (not shown) at the opposite end of the stack of the fuel cells. The electrons can, thereby, make a complete circuit from the negative terminal of the stack (the last of the anodes) via the external circuit 40 to the positive terminal of the stack (the first of the cathodes). Correspondingly, the hydrogen ions can migrate in each cell through the electrolyte continued in the matrix assembly proceeding from the anode of the cell through the cell to the cathode of the cell.

In operation, hydrogen is admitted through the manifold 12 to the passages 26 in the anodes 18 of each of the cells in the stack. Oxygen is admitted through the manifold 14 into the passages 26 of the cathodes 20 in each of the cells of the stack. Electrolyte is applied via the set of conduits 16 to make contact with the central layers 34 of the membranes 22 in the respective fuel cells of the stack. By capillary action, the electrolyte is brought into contact with the catalyst 30 in each of the electrodes 18 and 20. The hydrogen propagates from the passages 26 through the pores of the hydrophobic layer 28 to the catalyst 30 in the anode 18. The oxygen propagates from the passages 26 through the hydrophobic layer 28 to the catalyst 30 in the cathode 20. Thereby, the hydrogen and the electrolyte are placed in contact with each other at the interface of the catalyst 30 at the anode 18 and the oxygen and the electrolyte are placed in contact with each other at the interface of the catalyst 30 of the cathode 20. It is in these locations of the cell that the respective electrochemical reactions to produce electricity occur.

In accordance with a feature of the invention, the matrix asssembly 22 is continuously in contact with electrolyte brought in by the set of conduits 16 from an external reservoir (not shown in FIG. 1) of such electrolyte. This insures that the cell 10 is always filled with the requisite amount of electrolyte even in the presence of losses of electrolyte which may occur during operation of the cell 10. Losses of electrolyte in the region between the electrodes may occur during the operation of the cell 10 and, if not compensated for, can cause a reduction in the cell's output of electricity. Thereby, frequent shutdowns of the cell stack are not required to maintain the proper level of electrolyte in the outer layers 34 of the cells.

The central layer 32 is advantageously fabricated of a filamentary carbon paper manufactured by the Kureha Chemical Industry Company of Tokyo, Japan. The paper is composed of chopped carbon fiber produced from pitch and residual charred carbon of phenolic resin. The fine diameter filaments can average approximately 3 mm (millimeters) in length and, when bonded together, can form a uniformly thin web. The paper can be approximately 0.003 to 0.020 inches thick, preferably being approximately 0.009 to 0.011 inches thick, and is readily reduced in thickness under compression. The term "large pore" means pores approximately 50–300 microns in size while the term "small pore" means pore approximately 1–10 microns in size. During assembly of the cell 10, the layers thereof are compressed in sandwich-like form under a pressure of approximately 30 to 50 lbs. per square inch.

The outer layers 34 are Teflon-bonded silicon carbide. The silicon carbide is mixed with a suspension of Teflon and an inking vehicle such as polyethylene oxide. The mixture is applied to the catalyst side of the electrode and then smoothed such as by a blade. The mixture is dried and sintered.

The electrolyte is then added to the layers during assembly of the cell. The above described process produces a material having a small pore size in the ranges desired. Any suitable material can be used for layers 34. For instance, the material can be made from inert, solid, inorganic, porous particles bonded with an inert coagulated fluoro-carbon polymer in the form of a network structure, and a free concentrated acid electrolyte entrapped in said network, wherein the inorganic particles are a compound which is a member of the group consisting of an oxide, sulfate and phosphate of at least one of the metals zirconium, tantalum, tungsten, chromium, and niobium as described in U.S. Pat. No. 3,453,149. This patent is incorporated herein in its entirety by reference.

Further details on the construction of the respective layers of the cell 10 are well known, and are described, by way of example, in the foregoing U.S. Pat. No. 3,453,149, 4,064,322 and 4,175,165. These patents describe the construction of cells utilizing porous material with PTFE and coatings of precious metal catalysts. The multiple porosity characteristic of the matrix assembly 22 provides for both the hydrophilic properties of the outer layers 34 while utilizing the larger pores of the central layer 32 for holding, moving and distributing the electrolyte so as to maintain the electrolytic saturation of the outer layers 34 during operation of the cell 10. In addition, the presence of the electrolyte in all three layers of the matrix assembly 22 provides the requisite conduction path for the hydrogen ions. Thus, the matrix assembly 22 of the invention permits the cell 10 to operate normally while maintaining the uniform distribution and the proper level of electrolyte therein.

Figure 2:
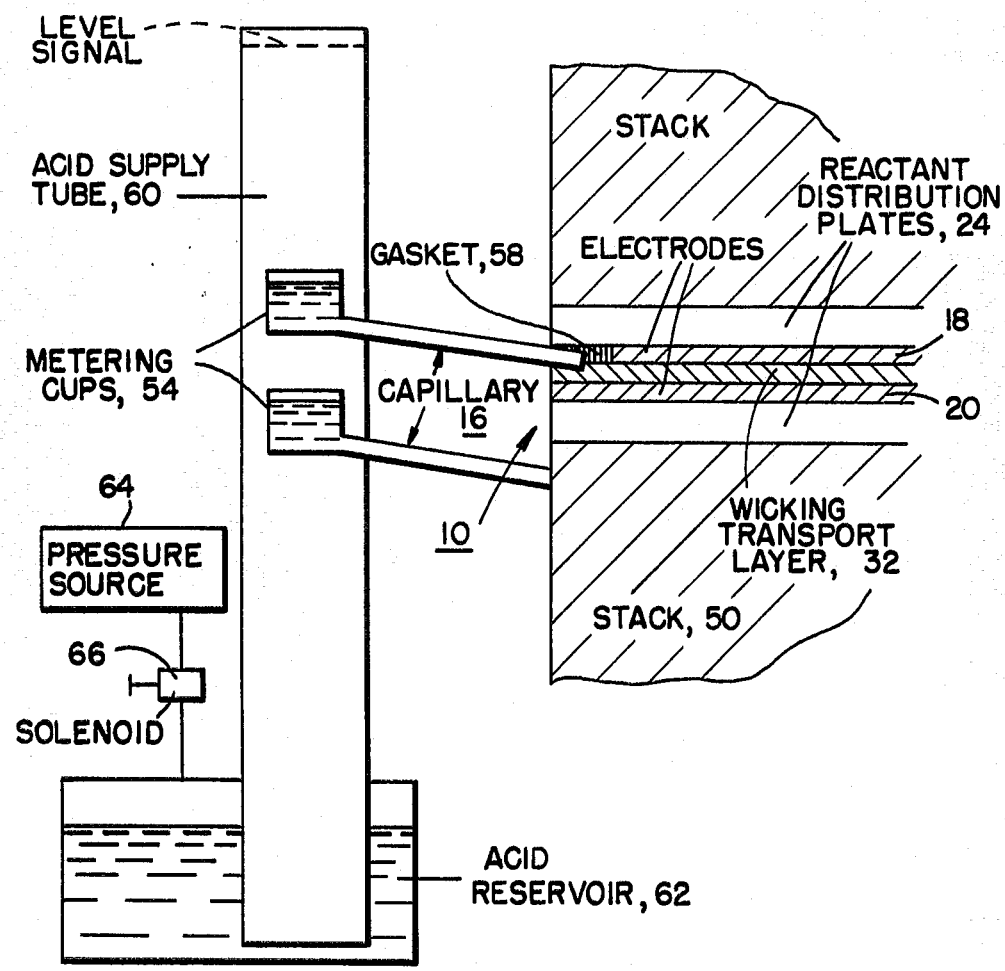
FIG. 2 is a diagrammatic view of a system for supplying electrolyte to a stack, each cell being of the form shown in FIG. 1.

As shown diagrammatically in FIG. 2, the cell 10 is part of a stack 50 of such cells. Also indicated diagrammatically in FIG. 2 are components of the fuel cell 10, namely, the plates 24 which distribute the gaseous reactants about the electrodes 18 and the central layer 32 of the matrix assembly 22 which serves as a means to draw and distribute electrolyte.

In accordance with the invention, the electrolyte distribution system 52 supplies electrolyte to each cell of the stack 50. The system 52 includes a set of metering cups 54 coupled individually to respective ones of the cells 10 by the conduits 16. Each conduit 16 is a capillary tube. An end of a conduit 16 is secured in a cell 10 at the layer 32 with the aid of a gasket 58 for guiding the electrolyte from the conduit 16 into the layer 32 for transport throughout the region between the electrodes 18. Alternatively, one cup can serve a suitably small number of cells in a stack. Assuming the electrolyte to be the aforementioned phosphoric acid, the acid is dispensed to the respective cups by means of passageway or cylinder 60 through which the acid is elevated from a reservoir 62. Any suitable means can be used to elevate the electrolyte such as a source 64 of air pressure. The air pressure acts through a solenoid valve 66 upon the surface of the acid in the reservoir 62. Pressure on the surface of the acid in the reservoir 62 drives the acid into the cylinder 60, and then upwards through the cylinder 60 to provide a column of acid which pours into the cups 54 and temporarily inundates the cups. After the filling of the cups, the air pressure is released, and the column of acid drops to its former level in the reservoir 62.

Figure 3:
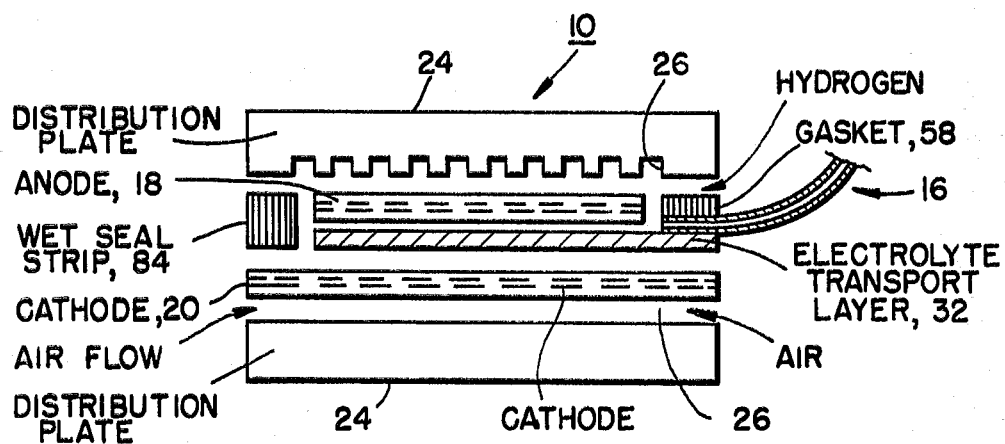
FIG. 3 is a diagrammatic view of a fuel cell, such as the cell of FIG. 1, showing the interconnection of a capillary tube to an electrolyte supporting member of the cell.

In accordance with a feature of the invention, the separation of the stored amounts of electrolyte in the respective cups 54 during the transport along the conduits 16 provides for electrical isolation of the electrolyte of the respective cells 10. Such electrical isolation prevents the generation of shunt currents among various ones of the cells 10 in the stack 50. Shunt currents are likely to develop if there were a connection path by means of electrolyte from one fuel cell to the next fuel cell. By separating the electrolyte of each of the cells 10, the cells are able to operate independently of each other. This enables the individual cells to be connected in a series arrangement for the development of substantial voltage and the cells to operate without danger of a short or shunt current developing. Connection of the end of a conduit 16 to an individual fuel cell, such as the cell 10, is made, as shown in FIG. 3, with the layer 32 and the aid of a gasket 58. However, a small amount of shunt current is tolerable in a practical sense and, thus, the connection of a suitably small number of cells to one conduit is permitted.

In operation, electrolyte is transported through the conduits 16 of the system 52 by gravity to enter fuel cells of a stack. By use of fuel cells constructed in accordance with the structure of FIG. 1, the central layer 32 of the matrix assembly 22 draws electrolyte by capillary forces into the space between the electrodes 18 and 20. As described in FIG. 1, the hydrophilic layer 34 of the matrix assembly 22 draws electrolyte from the central layer 32 and, thereby, creates space for more electrolyte which is provided by the movement of electrolyte down the conduits 16.

It is recognized that the rate of delivery of the electrolyte into a fuel cell 10 depends on the amount of hydrostatic pressure resulting from the difference in elevation between the top of the electrolyte in the cup 54 and the cell 10. The cups 54 are arranged with increasing height corresponding to the increasing height of the successive cells in the stack. In addition, the cups 54 are filled to the brim so that the hydrostatic pressures developed within the individual cups 54 are maintained at the requisite amounts for maintaining the desired hydrostatic pressure. The individual cups are open at their tops or mouths. Thereby, the fuel cells are filled with the requisite amounts of electrolyte without danger of overfilling. The electrolyte-containing compartments should be constructed so as to be electrically insulated from each other or made of a non-conducting material such as Teflon. They should also have good corrosion resistance against the electrolyte.

It is to be understood that the above-described embodiments of the invention are illustrative only and that modifications thereof may occur to those skilled in the art. Accordingly, this invention is not to be regarded as limited to the embodiment as disclosed herein, but it is to be limited only as defined by the appended claims.

What is claimed is:

1. A system for supplying electrolyte to fuel cells in a stack of fuel cells comprising:
    (a) means for storing electrolyte externally to said fuel cells, an individual one of said cells including a wicking medium for drawing electrolyte by capillary action;
    (b) means for conducting electrolyte from said storing means to the wicking medium in each of said cells; and
    (c) means for maintaining a predetermined hydrostatic pressure of electrolyte at said conducting means.

2. A system according to claim 1 wherein said storing means stores electrolyte separately for each of said fuel cells of said stack, and wherein said system is configured to provide electrical isolation among the separately stored electrolytes for each of said cells.

3. A system according to claim 2 wherein said storing means is in the form of a set of cups having open mouths, each of said cups being filled by applying electrolyte through its mouth until the cup overflows so as to maintain a predetermined depth and hydrostatic pressure within the storing means.

4. A system according to claim 3 wherein said conducting means comprises a set of capillary tubes, individual ones of said tubes being coupled from individual portions of said storing means to respective ones of said fuel cell.

5. A system according to claim 3 wherein said cups are of differing heights corresponding to differences in height among fuel cells of said stack to maintain the hydrostatic pressures at the respective cells.

6. A system according to claim 3 wherein said cups are filled by raising a column of electrolyte to temporarily inundate each of said cells.

7. The system as in claim 1 wherein said fuel cell has electrodes wherein electrochemical reactions take place between fluidic reactants and an electrolyte and said porous medium has first and second permeable layers, at least one of which is electrically insulating, said first layer being operably connected to said conducting means having relatively large pores for providing electrolyte in an ion conducting path between said electrodes and said second layer has relatively small pores for drawing electrolyte from said first layer, said second layer being positioned contiguous to an interaction surface of one of said electrodes for supplying electrolyte to the electrochemical reaction at said one electrode.

8. A system according to claim 7 wherein said electrolyte supporting structure comprises a third permeable layer arranged in a laminated format with said first and second layers, said third layer having relatively small pores as compared to the pores of said first layer for drawing electrolyte from said first layer, said third layer being positioned contiguous to an interaction surface of a second of said electrodes for supplying electrolyte to an electrochemical reaction at said second electrode.

9. A system according to claim 7 wherein said electrically insulating layer is formed of silicon carbide particles bonded with polytetrafluoroethylene.

10. The system according to claims 7, 8 or 9 wherein said large pores are approximately 50–300 microns in size and said small pores are approximately 1–10 microns in size.

* * * * *